United States Patent [19]

Guerra et al.

[11] Patent Number: 4,681,451
[45] Date of Patent: Jul. 21, 1987

[54] OPTICAL PROXIMITY IMAGING METHOD AND APPARATUS

[75] Inventors: John M. Guerra; William T. Plummer, both of Concord, Mass.

[73] Assignee: Polaroid Corporation, Cambridge, Mass.

[21] Appl. No.: 834,532

[22] Filed: Feb. 28, 1986

[51] Int. Cl.$^4$ .............................................. G01B 11/14
[52] U.S. Cl. ..................... 356/373; 356/375
[58] Field of Search ............. 356/128, 372, 373, 375; 350/286, 485; 250/231 R, 561, 571; 73/653, 655

[56] References Cited

U.S. PATENT DOCUMENTS

| | | | |
|---|---|---|---|
| 2,997,922 | 8/1961 | Kaprelian | 350/485 |
| 3,338,656 | 8/1967 | Astheimer | 350/320 |
| 3,987,668 | 10/1976 | Popenoe | 73/88 F |
| 4,032,889 | 6/1977 | Nassimbene | 340/146.3 E |
| 4,083,254 | 4/1978 | Nissl | 73/517 R |
| 4,165,155 | 8/1979 | Gordon, II et al. | 350/285 |
| 4,286,468 | 9/1981 | Altman | 73/655 |
| 4,322,979 | 4/1982 | Fromm | 73/705 |
| 4,451,123 | 5/1984 | McNeill et al. | 350/386 |

FOREIGN PATENT DOCUMENTS 0002602  1/1983  Japan ................................. 356/373

OTHER PUBLICATIONS

Harrick, Total Internal Reflection and Its Application to Surface Studies", *Annals of the New York Academy of Sciences*, vol. 101, 1963, pp. 928–959.

*Primary Examiner*—F. L. Evans
*Attorney, Agent, or Firm*—Francis J. Caufield

[57] ABSTRACT

An optical proximity imaging method and apparatus in which the proximity of glass surface to another surface is determined by frustration of total internal reflection of light energy from the glass surface to develop a light area pattern, calibrating gray scale densities of the pattern so that levels of density correspond to increments of surface proximity, and displaying a facsimile of the gray scale image to indicate variations in surface proximity. The pattern of frustrated totally reflected light energy is preferably magnified and the magnified image recorded by a television camera, the output of which is fed, in a preferred embodiment, to an oscilloscope capable of displaying a three axis image in which one of the three axes is determined by variation in gray scale density. In another embodiment, the output of the television camera is fed through a colorizer to assign different colors to different gray scale densities and a colored facsimile of the pattern image presented on a CRT screen.

20 Claims, 8 Drawing Figures

OPTICAL PROXIMITY IMAGING METHOD AND APPARATUS

BACKGROUND OF THE INVENTION

This invention relates to methods and apparatus for providing images of extremely small spacing gap variations within an area between mutually facing surfaces and, more particularly, it concerns a method and apparatus for displaying an image pattern representative of spacing gap variations between a glass surface and another stationary or moving surface on a real time basis, and wherein the image pattern can be calibrated to measure spacing gaps in the range of from about 18 microinches down to less than 1 microinch in increments of less than 0.5 microinches.

The magnetic recording media industry exemplifies a field in which there is an acute need for accurate measurement and/or observation of extremely small spacing gaps between surfaces of physical components. Specifically, dramatic increases in information bit density of recording media during recent years has necessitated correspondingly smaller head gaps to assure accurate transducing of information stored on the recording media. Heretofore, the flying height of a transducing head above a magnetic storage disk has been measured by substituting an optical head for the magnetic storage head and employing white light interferometry to obtain an indication of the spacing between the optical head and the disk surface. The interferometry method of proximity sensing involves analysis of a concentric ring pattern of interference bands known as "Newton's rings". Physical spacing between a spherical lens surface and another surface is related to the wavelength of light discernible by spectral color in the rings. In the context of physical gap measurement or proximity sensing, the minimum gap that can be discerned with interferometry alone is approximately 4.5 microinches.

Another characteristic of proximity sensing represented by the magnetic recording media art is that physical spacing of components within microinch tolerances is most commonly achieved by aerodynamic phenomenon in which relative movement of the components is required to maintain spacing. Thus, real time observation and measurement of the spacing gap is important to component calibration where all related operating parameters are to be accounted for. Prior attempts at adaptation of interferometry to real time measurement of the spacing between moving surfaces have been limited to computer processing of spectrophotometric data and, as such, have not attained a true real time indication of surface proximity.

It is also known that the proximity of a glass surface to the surface of another body will be revealed by frustration of total light reflection from the interior of the glass surface. If collimated light is directed through a glass body to the inside of a surface of the body at an angle greater than the critical angle, determined by the refractive index of the glass relative to the refractive index of the surrounding media such as air, the light will be totally reflected from the inside of the surface. The total reflection of the same light, however, will be reduced or frustrated by the close proximity to the outside of the same glass surface of another body or surface. Moreover, if the glass surface is a spherical surface of a large radius and the proximate surface of the outside body is planar, the frustration of total internal reflection will be revealed as a dark spot of radially decreasing density in an area of the internally reflected light. Although the phenomenon of frustrated total internal reflection has been used to indicate relative microspacing (U.S. Pat. Nos. 3,987,668, 4,286,468, and 4,322,979) or to modulate a light beam (U.S. Pat. Nos. 3,338,656, 4,165,155 and 4,451,123), it is not known that the phenomenon has been adapted to quantify microspacing increments nor to provide an image of microspacing topography throughout an area or field of interest.

SUMMARY OF THE PRESENT INVENTION

In accordance with the present invention, a real time image of variations in proximity between a glass surface of known contour and another surface is displayed by assigning gray scale density values to the pattern of light, reflected internally from the glass surface and frustrated by proximity of the other surface, and translating gray scale density to dimensional resolution in the image. The dimensional resolution may be either directly observable in the image or it may be presented as a topographic facsimile.

Calibration of a light pattern resulting from frustrating total internal reflection to gray scale densities is effected by placing the internally reflecting glass surface in point contact with another surface of a configuration selected to diverge predictably from the contact point. For example, the other surface may be flat in the case of a convex spherical reflecting glass surface or it may be spherically convex if the glass surface is flat. A microdensitometer scan of the resulting light pattern yields gray scale density variations to which microspacing increments may be assigned from the known or preestablished divergence of the two surfaces. Thereafter, the same gray scale densities are used as indicia of surface proximity.

An image of the area over which frustration of total internal reflection occurs is presented by forming a two dimensional, tonal facsimile of the frustrated internally reflected light pattern, preferably after magnification thereof, in which gray scale variations are represented either as a third dimension or as discrete colors. Preferably, the facsimile is formed on a real time basis by using a black and white television camera connected to a three dimensional oscilloscope, in which gray scale density variations are presented as height in a three dimensional image. Alternatively, the output of the camera may be fed to a conventional television receiver through a colorizer so that the image presented on the receiver is one in which discrete colors represent variations in gray scale density and thus of proximity variation.

A principal object of the invention, therefore, is the provision of a method and apparatus for presenting a real time image of an area in which an object surface is variably spaced from a glass surface. Another object of the invention is to provide such a method and apparatus by which spacing increments of one surface relative to another, as small as one microinch, may be displayed for observation and quantified. Still another object of the invention is to enable observation in three dimensions of an area of surface-to-surface proximity between relatively movable surfaces in a manner to indicate microspacing increments within the area on a real time basis.

Other objects and further scope of applicability of the invention will be made apparent from the detailed description to follow, taken in conjunction with the accompanying drawings in which like parts are designated by like reference characters.

DETAILED DESCRIPTION OF THE PREFERRED EMBODIMENTS

Figure 1:
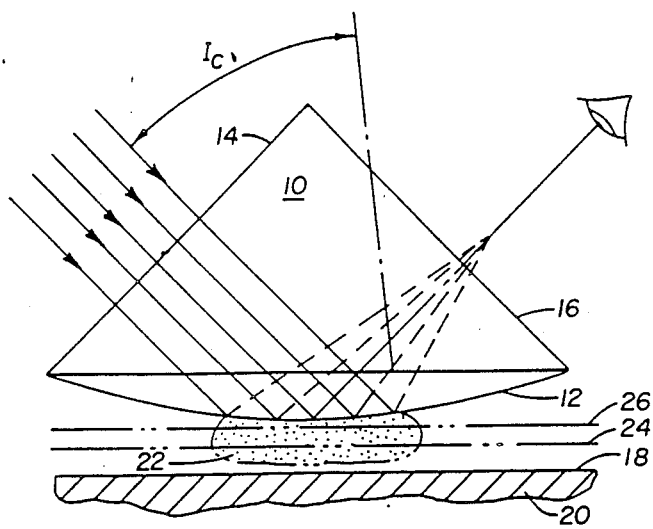
FIG. 1 is a schematic illustration of an arrangement showing total internal reflection of light from a spherical glass surface spaced adequately from another surface.

In FIG. 1 of the drawing, an optically transmissive body such as a glass block 10, having a large-radius spherical surface 12 and a pair of planar surfaces 14 and 16, is shown positioned so that the spherical surface 12 is spaced from a flat surface 18 on an object 20. Assuming adequate spacing of the surface 18 from the spherical surface 12, if collimated light is introduced at the planar surface 14 and passed through the block 10 to the spherical surface 12, all light meeting the inside of the surface 12 at an angle equal to or greater than the critical angle $I_c$ will be reflected from the surface 12 and exit from the surface 16. The internal reflection of light from the surface 12, however, results in an evanescent field 22 depicted by the stippled area adjacent to and outside of the surface 12 in FIG. 1. The evanescent field 22 extends from the surface 12 through a distance determined in substantial measure by the angle at which the incoming light meets the inside of the surface 12. Because light meeting the surface 12 at less than the critical angle $I_c$ will not be internally reflected, the evanescent field extends for the greatest distance from the surface 12 for that light meeting the surface at the critical angle and will retract toward the surface 12 for light meeting that surface at angles larger than the angle $I_c$.

It is to be noted that the terms "light" and "glass", as used herein and in the appended claims, are intended to include other wavelengths of energy and other materials which behave in the manner that light or optical energy behaves in a wide range of optical glasses and other materials transparent to such energy.

Figure 2:
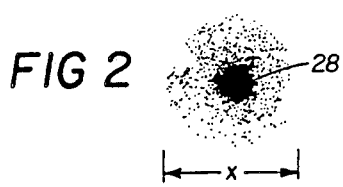
FIG. 2 is an illustration of a light pattern resulting from frustration of total internal reflection.

In FIG. 1, the surface 18 of the object 20 is spaced from the spherical surface 12 by a distance sufficient so that it lies outside of the evanescent field 22. In this condition, normal and total internal reflection of light from the spherical surface 12 occurs. If, however, the surface 18 is moved progressively toward the surface 12 through the positions represented by phantom lines 24 and 26 in FIG. 1, the internal reflection from the surface 12 progressively decays or becomes "frustrated". Moreover, the spherical contour of the surface 12 coupled with the planar nature of the surface 18 brings about maximum frustration of internal reflection at the center of the surface 12 with a gradual diminishing of frustration and corresponding increase of internal reflection as the surface 12 diverges from the surface 18 when the latter is positioned in the plane of lines 24 and 26. The result of the frustrated internal reflection is that light exiting from the surface 16 will appear as a dark patch 28 in the center of an otherwise illuminated region at the surface 16. As depicted in FIG. 2 of the drawings, the dark patch 28 presented on the surface 16 diminishes in darkness or density radially from its center and disappears at its periphery as delimited by its diameter x.

Gray scale density variation in the patch 28 is the product solely of the known or predictable divergence of the flat surface 18 from the spherical surface 12, assuming all other parameters remain constant. In this respect, the same patch 28 or pattern of light would be presented at the surface 16 where the internally reflecting glass surface is flat and the surface 18 is spherically convex. In either case, the known rate of divergence of the surfaces 12 and 18 is used, in accordance with the present invention, to calibrate gray scale densities of the patch 28 in increments of spacing variations between the surfaces 12 and 18. Apart from surface configuration to attain the predictable divergence of the two surfaces, all other parameters such as the intensity and wavelength content of the light to be reflected, the angle of incidence of the light to the internally reflecting surface, the index of refraction of the glass block and the media on which the surface 18 is formed, remain the same during calibration and during use of the invention to present an image of proximity variation between two surfaces.

Figure 3:
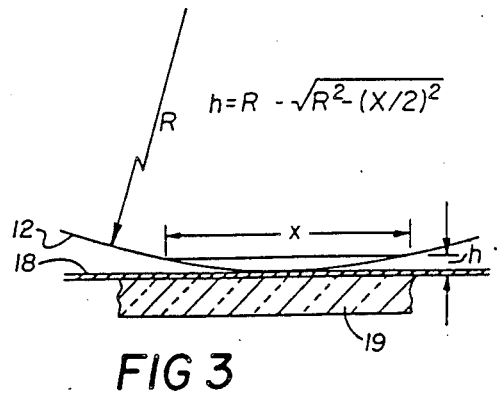
FIG. 3 is a graphic illustration exemplifying a manner of calibrating frustrated total internal reflection to variations in surface proximity in accordance with the present invention.
Figure 4:
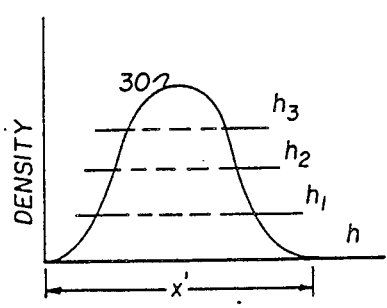
FIG. 4 is a graph plot of gray scale density against diameter of the light pattern of FIG. 2.

Specifically, and as may be understood by reference to FIGS. 2-4 of the drawings, gray scale calibration of the patch 28 is performed by placing the equivalent of the surfaces 12 and 18 in contact with each other as shown in FIG. 3. In this instance, a spherical internally reflecting glass surface 12 of a radius R is used with a flat surface 18. If it is assumed that the surface 18 is the surface of a magnetic recording disk or tape, for example, it is preferred that the media be affixed to an optical flat 19 to assure a planar orientation of the surface 18. Light is then directed to the surface as explained above with respect to FIG. 1 so that the pattern 28, representing frustration of total internal reflection, is presented at the surface 16. The pattern is preferably magnified and a microdensitometer scan of the magnified pattern taken. Values of gray scale density are then plotted against the diameter x' of the magnified pattern to yield a curve 30 as shown in FIG. 4. Having the dimension x', a chord length equal to the patch diameter x may be calculated by dividing out the magnification factor used to arrive at the dimension x'. Then, the spacing h between the surface 12 and the surface 18 at the end of the chord may be calculated using the equation shown in FIG. 3.

Because the peak of the curve 30 in FIG. 4 represents contact whereas the base of the curve is known to represent the gray scale density at a spacing increment h, intermediate increments of spacing such as $h_1$, $h_2$, and $h_3$ may be assigned to density values on the curve 30 which correspond directly to values of density variation in the patch 28. It is to be noted that the increments of spacing and of gray scale density represented by the values $h_1$, $h_2$ and $h_3$ in FIG. 4 are for illustration only and in practice may be of increments reduced considerably from that shown in FIG. 4 depending on the sensitivity of equipment used to discern gray scale density in the patch or pattern 28. In this respect, commercially available black and white television cameras are able to resolve up to 64 levels of gray scale density. Thus, if it is assumed that the spacing variation represented by the dimension h is approximately 18 microinches, spacing increments as small as approximately 0.3 microinches may be resolved.

Figure 5:
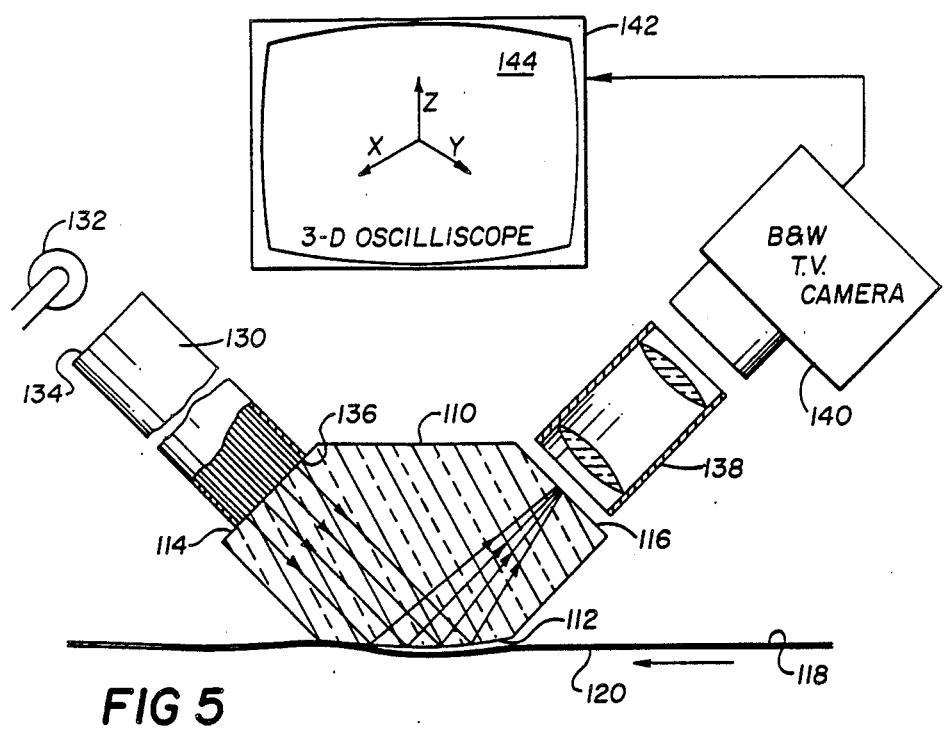
FIG. 5 is a schematic view depicting a preferred embodiment of apparatus in accordance with the present invention.

An embodiment of apparatus by which the method of the invention may be practiced to provide a real time indication of proximity spacing variations between the equivalent of the surface 12 and a proximate object is illustrated in FIG. 5 of the drawings. In FIG. 5, a glass block 110 has been substituted for the block 10 previously described but again is provided with an internal reflecting surface 112, a planar light receiving surface 114 and a planar light exit surface 116. Also the surface 112 is shown to be a convex spherical surface but may be of other configurations as will be explained. If the apparatus is used to determine the head spacing gap characteristics between a recording head and a magnetic recording media 120, for example, the block 110 is substituted for the conventional magnetic head and the magnetic recording media 120 driven so that the information receiving surface 118 thereof is positioned in proximity to the surface 112. The media 120 may be set into motion to develop aerodynamic characteristics incident to establishing the spacing of the surface 118 from the glass surface 112.

To provide a source of collimated or quasi-collimated light to be reflected from the interior of the spherical surface 112, an optical fiber bundle 130 is supplied with white light from a source 132 at one end 134 of the bundle whereas the other end 136 abuts against the planar surface 114 of the block 110. Light passed into the glass block 110 from the optical fiber 130 is "quasi-collimated" in the sense that the major portion of light exiting from each individual fiber in the bundle is directionally established by the angle of the planar surface 114 relative to the spherical surface 112. The degree of collimation can be varied within limits falling short of total collimation by size selection of the fibers forming the bundle 130. For example, by selecting fibers typically used for single mode transmission of optical energy, or fibers having a core diameter approximating 5 microns, the light presented by the bundle 130 approaches collimation as a result of the extremely small numerical aperture of such fibers. Larger individual fibers will reduce the measure of collimation but also facilitate a larger range of wavelengths of light that may be used effectively. It is preferred that the light exiting each individual fiber in the bundle 130 will have directional components tending to reduce collimation but not to an extent where light passing through the surface 14 might travel directly to the surface 116. In other words, the degree of collimation is adequate when the major portion of light reaching the planar surface 16 is reflected from the interior of the surface 112. This less than total collimation of light introduced to the block 110 contributes to an averaging effect on light reflected from the interior of the surface 112 and, in so doing, allows increased tolerances in such physical parameters as glass surface precision, block mounting precision and light reflection angles.

The pattern of light presented at the surface 116 as a result of frustration of total internal reflection from the surface 112, due to proximity of the surface 112 with the surface 118 on the magnetic recording media, is magnified from 40 to 100 times by a microscope 138. The enlarged gray scale image produced by the microscope 138 is converted to a facsimile in which gray scale densities at coordinate locations throughout the area of the magnified image are recorded. A black and white television camera 140 is especially well suited for this recording function because of its ability to record both the image of the pattern and variations in gray scale densities throughout the pattern with a high degree of resolution and on a real time basis. The electronic facsimile of the magnified image recorded by the camera 140 is preferably fed to a three dimensional oscilloscope 142 having a screen 144 on which the orthogonal coordinates of the magnified image may be presented on "x" and "y" axes whereas gray scale density variations are presented on a third or "z" axis. Both the television camera 140 and the oscilloscope 142 are conventional and may be purchased to enable a direct plug-in of the camera to the oscilloscope. Excellent results have been obtained, for example, using for the oscilloscope 142 an "Isomat 600, 3-D Profiler" purchased from Image Technology Methods Corporation of Waltham, Mass. The camera 140 used with the identified oscilloscope is a video camera "Model 201 Series" purchased from the same company. In this combination of components, the oscilloscope 142 is equipped with input jacks adaptable for direct reception of the output leads of the camera 140.

Figure 7:
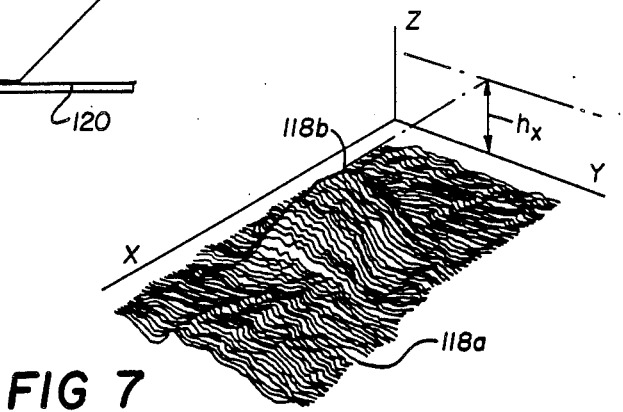
FIG. 7 is an illustration approximating the characteristics of an image which can be presented with the embodiment of FIG. 5.

While the actual image displayed by the oscilloscope 142 does not appear in FIG. 5, the illustration in FIG. 7 is representative of the general nature of an image which may be made to appear on the oscilloscope screen 144 with the apparatus shown in FIG. 5. In FIG. 7, the profile of a surface 118a is illustrated and, in this instance, includes an apparent projection 118b. The image of FIG. 7 is, moreover, directly convertible to measurements of surface proximity. In the image simulation shown, for example, the height of the projection 118b above a reference plane x-y is indicated along the z axis and to be of a dimension $h_x$.

Figure 6:
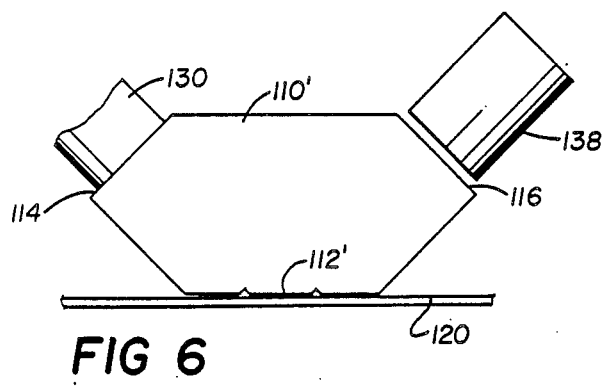
FIG. 6 is a schematic illustration depicting a modification of the embodiment in FIG. 5.

In FIG. 6 of the drawings, a variation of the embodiment illustrated in FIG. 5 is shown in which a block 110' is substituted for the block 110 of FIG. 5. The principal difference between the block 110' and the block 110 lies in the conformation of the reflecting surface 112'. In FIG. 6, a generally flat reflecting surface 112' is used in which transverse notches, simulating the surface configuration of a magnetic recording head, are provided. While the transverse notches illustrated in FIG. 6 will be translated to the image pattern of frustrated internal reflection from the surface 112', operation thereof is the same as the previously described embodiment assuming appropriate calibration in accordance with the method described above.

Figure 8:
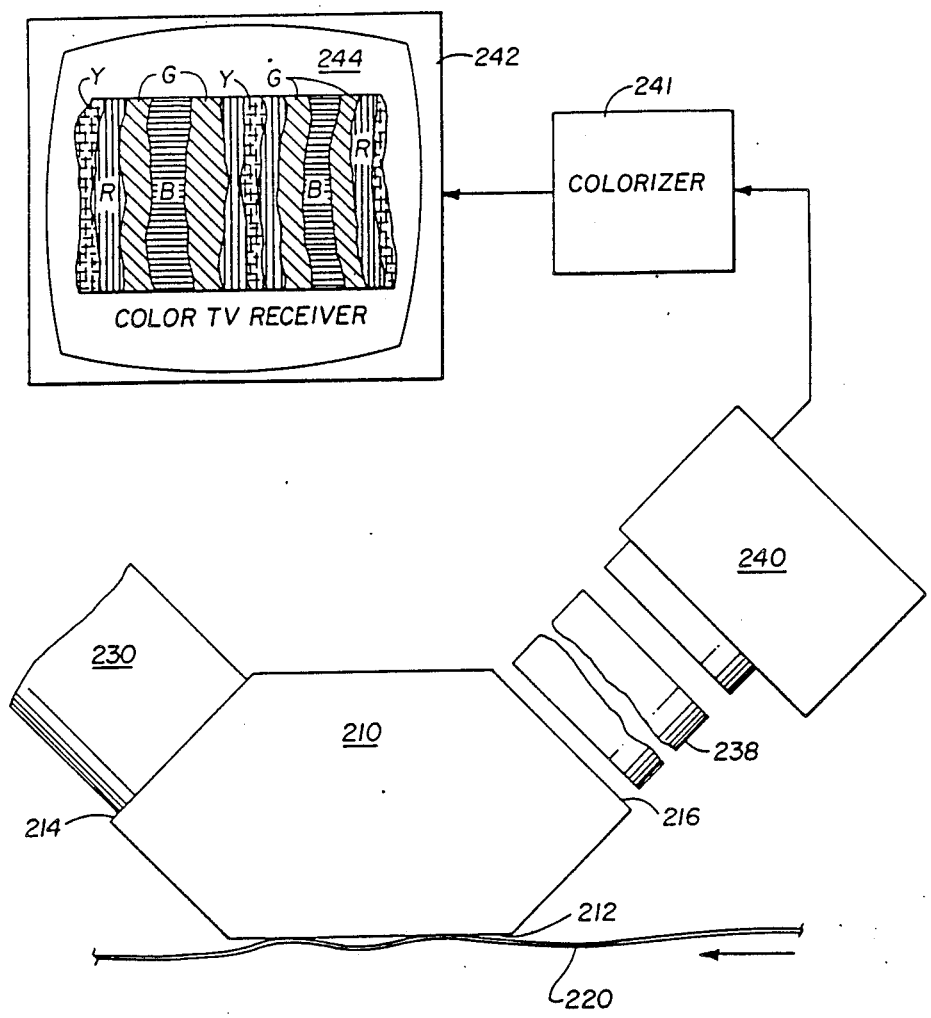
FIG. 8 is a schematic view illustrating an alternative embodiment of the invention.

In FIG. 8 of the drawings, an alternative embodiment of the present invention is illustrated. In the embodiment of FIG. 8, parts previously described with reference to FIGS. 1–7 are identified by the same reference numerals but in a 200 series. Thus, the glass block 210 is shown in FIG. 8 to have a planar internal reflecting surface 212 to which light is fed from an optical fiber bundle 230. The pattern of frustrated internally reflected light at the surface 216 is again magnified by a microscope 238 and the magnified image presented to a black and white television camera 240 which may be of the same type described above with reference to FIG. 5.

The output of the black and white television camera 240 in FIG. 8 is fed to a colorizer 241. The colorizer 241 may be any of several commercially available colorizers which function to assign a single color to a specific level of gray scale density. Such colorizers are commonly used to convert radar weather maps to areas of color depicting different densities of gray in a black and white radar screen display and are available to provide as many as eight discrete colors for an equal number of variations in gray scale density. The output signal of the colorizer in the embodiment of FIG. 8 is fed directly to a conventional color television receiver 42 having a viewing screen 244.

In FIG. 8, a tape 220 of magnetic recording media is fed under the internally reflecting surface 212 and is illustrated as following an undulating path which variably approaches and recedes from the surface 212. The result of the undulating path of the tape 220 adjacent to the surface 212 is approximated on the screen 244 in FIG. 8. In other words, as the tape 220 moves closer to the surface 212, the multicolored image on the screen 244 in the embodiment illustrated appears "blue" in color. The color "yellow", in the illustrated embodiment, represents regions of maximum spacing between the surface on the tape 220 and the reflecting surface 212. By calibating the gray scale densities provided by the microscope 238 in the manner aforementioned, it will be appreciated that the equivalent of a topographical or contoured map of the area between the surface 212 and an adjacent media will be presented on the television screen 244.

Although the invention has particular utility in the magnetic media/recording head application described, it is contemplated that other microimaging needs may be met by the invention. For example, the surface characteristics of a stationary specimen may be observed and quantified where the specimen is merely placed on an inverted form of the glass blocks 10, 110, 110' or 210. In other words, the imaging character of the invention is applicable to any object where proximity variation from the internally reflecting surface provides information relative to the specimen under observation.

A glass body is utilized in the preferred embodiment for providing internal reflection, however, it is primarily of importance only that the body be optically transmissive, and other transmissive materials such as plastics and diamond are generally applicable. Further, the optically transmissive material need not be restricted to transmission over the complete optical spectrum, but can be limited in accordance with the optical wavelength utilized, for example, a germanium body can be employed with infra red wavelengths.

Thus, it will be appreciated that as a result of the present invention, a highly effective method and apparatus is provided for displaying measurable images of extremely small spacing gaps by which the stated objectives are completely fulfilled. It is also contemplated and will be apparent from those skilled in the art from the preceeding description that variations in the embodiments illustrated and described herein may be made without departure from the invention. It is expressly intended, therefore, that the foregoing description and accompanying drawing illustrations are illustrative of preferred embodiments only, not limiting, and that the true spirit and scope of the present invention will be determined by reference to the appended claims.

What is claimed is:

1. The method of forming an image representing the proximity between a given surface of an optically transmissive body and another surface, said method comprising the steps of:
    directing light energy to the interior of the transmissive body at an angle to the given surface so that substantially all such light energy is normally reflected from the interior of the given surface;
    frustrating interior reflection of said light energy from said given surface by proximity of the other surface;
    forming a pattern of the frustrated total internal reflection of light energy from said given surface; and
    calibrating gray scale density variation of said pattern to spacing between the surfaces.

2. The method recited in claim 1, including the step of presenting an image of said calibrated pattern in which variations in gray scale density over the area of surface proximity may be observed.

3. The method recited in claim 2, wherein said image is a contoured display of proximity variation.

4. The method recited in claim 3, wherein said image is a colored display in which different increments of proximity are represented by different colors.

5. The method recited in claim 2, wherein said image is a three dimensional display in which one dimension is determined by gray scale density of said pattern.

6. The method recited in claim 1, wherein said calibrating step comprises:
    placing said given surface in contact with another surface from which the contour of said given surface diverges at a predetermined rate of divergence;
    determining the breadth of said pattern of frustrated total internal reflection;
    determining the height of said given surface from said other surface at a point corresponding to the breadth of said pattern; and
    assigning increments of surface proximity measurements less than the determined height to levels of constant gray scale density.

7. The method recited in claim 6, comprising the step of forming a magnified image of said pattern, measuring the magnified image to determine the breadth thereof and dividing the measured breadth by the magnification factor to determine the breadth of said pattern.

8. The method recited in claim 6, wherein said given surface is spherically convex and said other surface is flat.

9. The method recited in claim 1, wherein light energy is directed to the interior of said given surface using an optical fiber bundle so that the measure of light energy collimation is substantial.

10. Apparatus for displaying variations in proximity between a given surface of a transmissive body and another surface, said apparatus comprising:
    an optically transmissive body having a reflecting surface and a pair of angularly disposed planar surfaces between which said reflecting surface is located with one of said planar surfaces being a light energy entrance surface and the other a light energy exit surface, said planar surface being oriented so that light energy introduced at said planar entrance surface is normally reflected totally from the interior of said reflecting surface to said planar exit surface so that a light pattern of variable intensity emerges from said planar exit surface due to the frustration of total internal reflection from said reflecting surface as said reflecting surface is brought sufficiently proximate another surface;

means for displaying an observable image of said light pattern such that variations in the denisty of the image of the said light pattern represent proximity variations between said other surface and said reflecting surface; and means for resolving variations of gray scale density in said image of said light pattern to obtain the variations of proximity between said reflecting surface and said other surface.

11. The apparatus recited in claim 10, wherein said reflecting surface is a chord segment of a sphere having a predetermined radius.

12. The apparatus recited in claim 11, wherein said radius is on the order of 20 inches or more.

13. The apparatus recited in claim 10, in which said reflecting surface is flat.

14. The apparatus recited in claim 10, comprising means for presenting substantially collimated light energy at said planar entrance surface.

15. The apparatus recited in claim 14, wherein said means for presenting light energy at said entrance surface comprises an optical fiber bundle.

16. The apparatus recited in claim 15, wherein said optical fiber bundle consists essentially of individual fibers having a core diameter approximating 5 microns.

17. The apparatus recited in claim 10, wherein said means for displaying an image of the light pattern at said exit surface comprises a microscope.

18. The apparatus recited in either of claims 10 or 17, wherein said means for resolving variations in gray scale density comprises a black and white television camera.

19. The apparatus recited in claim 18, wherein said means for displaying an image of said light pattern comprises means for imparting discrete colors to increments of uniform gray scale density in said image.

20. The apparatus recited in claim 18, wherein said means for displaying an image of said pattern comprises a three-axis oscilloscope having means for displaying variations in gray scale density on one of the three axes.

* * * * *